ns having im-
United States Patent Office 3,373,228
Patented Mar. 12, 1968

3,373,228
POLYVINYL CHLORIDE RESINS HAVING IMPROVED FUSING PROPERTIES
Emmett Jean Glazer, Stow, and Edwin Studley Smith, Cuyahoga Falls, Ohio, assignors to The Goodyear Tire & Rubber Company, Akron, Ohio, a corporation of Ohio
No Drawing. Continuation-in-part of application Ser. No. 335,401, Jan. 2, 1964. This application Oct. 5, 1966, Ser. No. 584,344
4 Claims. (Cl. 260—884)

ABSTRACT OF THE DISCLOSURE

More readily processed thermoplastic resins characterized by reduced fusing time requirements during elevated temperature, high shear processing are formed by polymerization of a "soft" resin in the presence of a "hard" resin. A resin such as vinyl chloride forms the core of the particle and is surrounded by a shell of a softer resin such as a vinyl chloride/vinylidene chloride polymer.

---

This invention relates to vinyl polymers having improved fusibility and to the process for its production.

This is a continuation-in-part application of our application Ser. No. 335,401, filed Jan. 2, 1964.

Vinyl halide resins in general and particularly polyvinyl chloride, are converted to a highly useful resinous composition when subjected to heat treatment which will cause a fusion of the resin particles into a homogenous and thermoplastic mass. When the fusion temperature is brought about at least partially by mechanical action, as may be developed on a roll mill as in calendering, or by an extrusion operation through a die, certain qualities in the vinyl resin are needed to assure clear, gel free articles of manufacture.

The total time required to process a vinyl resin in a process requiring mechanical action such as on a mill includes both the time required to bring the resin to its fusion temperature and the time required to work away any gel particles which might be present. Anything that would shorten either period of time would result in a product with considerable economic advantage to the processor. The same problem is experienced with regard to the extrusion of the resin into shaped articles such as pipes, moldings, etc., or the extrusion of the resin onto a wire being run through an extruder die.

It has now been discovered that the fusion characteristics of a vinyl halide resin may be greatly improved in a facile, efficient and economical manner when using the process of this invention.

The process of this invention relates to the encapsulation of the vinyl halide polymer as core particles with a different polymer having fusion characteristics different from those of the core polymer. The following examples are representative of the manner in which the present invention may be practiced. All parts are by weight unless otherwise identified.

Example 1 (control)

The following polymerization formula was used in the production of polyvinyl chloride as a control resin:

| | Parts |
|---|---|
| Vinyl chloride | 100 |
| Lauroyl peroxide | 0.3 |
| Water | 200 |
| Methocel 90 HG 100 (hydroxypropyl cellulose) | 0.10 |

A conventional glass lined pressure vessel equipped with external heating and cooling means and a propeller to permit agitation of the contents was first evacuated and then charged with 200 parts of water containing the various reactants listed above to act as the medium in which the 100 parts of vinyl chloride monomer was suspended. The following conditions of polymerization were maintained:

| | Used | Range |
|---|---|---|
| Polymerization Temp | 134° F | 50–200° F. |
| R.p.m. of propeller | 450 | 50–2,000. |
| Polymerization Time | 14 hours | 2–40 hours. |
| Pressure on Polymerization System | 125 p.s.i | Equal to or greater than the vapor pressure at the temperature being used. |
| Water to Monomer ratio | 2:1 | 0.5:1 to 4:1. |

The polymerization of the vinyl chloride monomer proceeded smoothly and at the end of 14 hours the reaction was substantially complete at 90% conversion and the polymer recovered by filtering the reaction product from the suspension system. The vinyl chloride resin prepared in this manner required 300 seconds to fuse the compounded resin. Fusion is the time required to fuse 100 parts of resin with 25 parts of dioctylphthalate and 2 parts of a tin butyl mercaptide, into a clear sheet on a two roll mill, each roll 1 foot wide and 6" in diameter set ⅛" apart at the bite rotating at 100 r.p.m. and heated at 300° F.

Example 2

The polymerization conditions of Example 1 above were repeated in this example with the exception that 1 part of vinylidene chloride was introduced into the reaction mixture after the pressure on the system had fallen from 125 p.s.i. to 75 p.s.i., or about 80% conversion.

The polymerization was continued until conversion was substantially complete as indicated by a drop in pressure to 50 p.s.i. equivalent to about 90% conversion.

The vinyl polymer was recovered in the same manner indicated for Example 1 and required only 100 seconds to fuse to a clear sheet under the same conditions set forth in Example 1 above.

Although the present invention is disclosed in connection with the polymerization of vinyl chloride as the principal component of the vinyl resin and vinylidene chloride as the copolymerizing monomer used in the latter conversion period of polymerization to form the encapsulating layer, the products and the process of the present invention are applicable to the polymerization of any ethylenically unsaturated monomer, particularly where the resulting polymer is difficult to fuse when worked mechanically on a roll mill or through an extruder. Monomers of particular significance in this regard may be referred to as the primary or essential monomers and include particularly acrylonitrile and the vinyl halides such as vinyl chloride, vinyl bromide, vinyl fluoride, vinyl iodide, as well as the vinylidene halides including vinylidene chloride, vinylidene bromide, vinylidene fluoride and vinylidene iodide. Any monomer which forms a polymer which is difficult to fuse into a continuous sheet under the conditions defined in Example 1 may be used in making the primary polymer.

Conveniently, the primary monomers that may be advantageously polymerized in accordance with the process of this invention may be represented by the formula having the following structure:

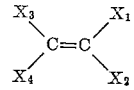

wherein $X_1$, $X_2$, $X_3$, and $X_4$ may be cyano, hydrogen, chlorine, bromine, fluorine or iodine.

The secondary monomers used in forming the copolymer with the unreacted primary monomer may also have this same structural formula. The secondary monomer is chosen on the basis that it will react with the primary monomer to produce a copolymer which will soften at a lower temperature than does the resin of the primary monomer soften.

Catalysts that are soluble in the monomer and useful in the process for causing the polymerization of the monomers indicated include lauroyl peroxide, tertiary butyl peroxypivalate, benzoyl peroxide, dicaproyl peroxide, acetyl benzoyl peroxide, diacetyl peroxide, para-tertiary butyl perbenzoate, and tertiary butyl perlaurate. These catalysts may be used in an amount from 0.01 to 1.0 part per 100 parts of monomer being polymerized.

Any suspending agent ordinarily used in the process of this invention may be used including gelatin, pectin, methyl cellulose, hydroxypropyl cellulose, carboxymethyl cellulose, alginates, and soluble starch, gum acacia, gum tragon, agar-agar and tragacanth. These suspending agents may be used in an amount from .01 to 2% per 100 parts of monomer being polymerized.

In making the polymer composition of the present invention it is desirable to encapsulate the primary polymer with a secondary polymer having a $T_g$ value lower by at least about 10° F. and preferably by about 25° F. than the $T_g$ value of the primary polymer. The dilatometrically determined glass transformation temperature commonly referred to as the $T_g$ value is measured as the temperature corresponding to the change in abrupt slope observed in a plot of specific volume vs temperature. Thus it is essential that the encapsulating secondary polymer soften, fuse or become tacky at a temperature lower than the polymer being encapsulated. Temperatures required to affect a softening of the resin are those in the vicinity of temperatures developed on a calender roll or mill used as a means of imparting heat necessary to cause fusion while mechanically mixing the resin, which mixing operation also generates heat within the body of the resin. Temperatures generated on a mill may fall within the range of from about 200° F. to about 400° F.

The secondary shell forming polymer need only be present in an amount sufficient to encapsulate the primary core polymer as a very thin coating so that in a given quantity of primary polymer from about 10% to about 1% of secondary polymer is present. It is found that when from about 10% of secondary polymer to as little as about 1% is used, a conversion of the primary polymer to a fused clear and gel free mass is obtained in a shorter time than would otherwise be needed if the same primary polymer were not coated or encapsulated with the secondary polymer made by polymerizing a monomer composition comprising the unreacted first monomer used in making the core polymer and a second and different ethylenically unsaturated monomer added to the first monomer in an amount such that the resulting copolymer has a $T_g$ value lower by at least 10° F. than the $T_g$ value of the core polymer.

When 10% of vinyl chloride remains in the reaction mixture, the addition of 1 part of vinylidene chloride results in the formation of a monomer mixture having an instantaneous combining ratio of 75/25 vinyl chloride to vinylidene chloride.

Thus, the composition of the shell forming copolymer is controlled by adding a certain amount of the second monomer as shown above to the polymerization system which has in turn been controlled to the extent that the primary monomer has been converted to polymer in an amount ranging from 60 to 99% of substantial completion. By substantial completion is meant the percent conversion of monomer to polymer obtained under the conditions of temperature, time and catalyst normally used in commercial production and as shown in Examples 1 and 2 for vinyl chloride. For example, if one part of vinylidene chloride was added at the instant the pressure in the reaction vessel broke, which would be the point at which the pressure was first reduced due to conversion of the monomer to polymer and which is estimated to be at about 60% conversion, the monomer composition of vinyl chloride and vinylidene chloride immediately after addition of the vinylidene chloride to the reaction would be 40/1 or 97.5/2.5 vinyl chloride/vinylidene chloride. If the addition of vinylidene chloride to the reaction is made after the pressure in the reaction vessel has fallen to 80 p.s.i., which represents about 80% conversion, the monomer composition would be about 95/5 vinyl chloride/vinylidene chloride. A monomer composition of about 90/10 vinyl chloride/vinylidene chloride is considered to be present when 1 part of vinylidene chloride is added to the reaction mixture after the pressure has dropped to 50 p.s.i. or which represents about 90% conversion.

When, for example, vinylidene chloride is added to the reaction mixture as described in Example 2 above after about 60% conversion, no noticeable improvement is obtained in regard to the fusion characteristics of the resulting polymer. A definite improvement in the fusion characteristics or the rate of disappearance of gel from the polymer compound when mechanically worked on a roll mill is observed when the vinylidene chloride is added to the reaction mixture after the pressure has fallen to between 50 and 75 p.s.i. which represents a monomer to polymer conversion from about 80% to about 90%.

The process of this invention operates to encapsulate the primary polymer with a layer of copolymer which in the case of vinylidene chloride has a lower softening point when copolymerized with vinyl chloride than does the polyvinyl chloride particle or core being encapsulated. This imparts to the polyvinyl chloride particle a surface which becomes tacky at a temperature lower than the temperature required to produce the same degree of tackiness on a polyvinyl chloride particle. This tendency for the outer covering to soften at a lower temperature results in a more rapid buildup of the viscosity of the mass of resin and thereby increases the rate at which the mill can apply work to the resin which in turn causes an increase in the rate at which the gel particles are worked away from the resin. As mentioned before, conventional polyvinyl chloride resins require up to 300 seconds on a standard two roll mill to bring about fusion and substantial elimination of any gel which shows up as so-called "fisheyes" in a 1 to 10 mil thick sheet. Vinyl resins made in accordance with the present invention, on the other hand, possess the improved fusion characteristics discussed above as evidenced by the fact that the same quantity of resin worked on the same type of mill for conventional resins is fused within 100 seconds and substantially all of the gel content has disappeared, thus permitting the calendering of the fused resin into sheets from 1 to 10 mils thick without the presence of objectionable "fisheyes."

Although this invention has been described in terms of the partial conversion of the primary monomer to polymer and in the case of vinyl chloride, before the secondary monomer is added, the invention is not limited to this specific improvement but rather applies equally to a condition where additional primary monomer together with a small amount of secondary monomer is added to the completely polymerized primary monomer reaction mixture so as to form an encapsulating layer of copolymer on the preformed primary polymer particles having a softening point lower than the softening point of the preformed resin particle being encapsulated. It is preferred, however, to add the secondary monomer to the reaction mixture after a predetermined conversion of monomer to polymer has taken place, because this embodiment insures the formation of the copolymer on the surface of the preformed polymer and virtually eliminates the formation of the copolymer apart from the preformed polymers. It is also possible to use as the primary particle a relatively hard copolymer and as the encapsulating layer a relatively soft copolymer.

The new product of the process of this invention is useful in the formation of conventionally extruded shapes and forms including tubing of all kinds and molding of all shapes, as well as the calendering of the resin into sheet goods ranging from 1 to 10 mils in thickness for shower curtains, raincoats, and numerous other well-known uses. The advantage in the use of the products of this invention in the manufacture of goods of this nature may be readily appreciated as discussed above in the fact that the fusion of the resin into a commercially usable condition is brought about in much less time and in a manner more efficient, facile and economical than heretofore found possible.

While certain representative embodiments and details have been shown for the purpose of illustrating the invention, it will be apparent to those skilled in this art that various changes and modifications may be made therein without departing from the spirit or scope of the invention.

What is claimed is:

1. A fusible resin comprising a primary polymer resulting from the polymerization of vinyl chloride as a first monomer, a secondary polymer formed in the presence of the primary polymer and in the same reaction medium in which the primary polymer is formed, the secondary polymer resulting from the polymerization of a monomer composition comprising said first monomer and vinylidene chloride as a second monomer, the second monomer being present in an amount of from about .1 part to about 2 parts per 100 parts of primary polymer and the secondary polymer being present in an amount of from about 1% to 10% of the primary polymer present.

2. A resin composition comprising polyvinyl chloride resulting from the polymerization of vinyl chloride carried to a conversion of from about 60% to about 99% of substantial completion, the polyvinyl chloride being associated with a polymer resulting from the polymerization of a monomer composition comprising vinyl chloride and vinylidene chloride present in a ratio of vinyl chloride to vinylidene chloride of from about 97:3 to 33:67, the vinylidene chloride being present in an amount from .1 part to 2 parts per 100 parts of polyvinyl chloride, and the second polymer being present in an amount of from about 1% to 10% of the polyvinyl chloride.

3. The resin of claim 1 wherein the vinyl chloride monomer was carried to a conversion of about 80% and then 1 part of vinylidene chloride was added and the resulting monomer mixture was carried to a conversion of about 90%.

4. A process for forming a resinous composition which comprises polymerizing vinyl chloride as a first monomer to a conversion of from 60% to 99% of substantial completion to form a first polymer, adding vinylidene chloride as a second monomer to the polymerization reaction after the first monomer has been carried to a conversion of from 60% to 99% of substantial completion, polymerizing the second monomer in the presence of unreacted first monomer to form a second polymer from a monomer composition comprising unreacted first monomer and second monomer, the second monomer being present in an amount of from .1 part to 2 parts per 100 parts of first polymer present in the composition, the second polymer being present in an amount from about 1% to 10% of the first polymer.

References Cited
UNITED STATES PATENTS

| | | | |
|---|---|---|---|
| 2,713,568 | 7/1955 | Fisher et al. | 260—884 |
| 2,746,944 | 5/1956 | Naps et al. | 260—884 |
| 2,791,600 | 5/1957 | Schwaegerle | 260—884 |
| 3,254,044 | 5/1966 | Gunderman et al. | 260—884 |

MURRAY TILLMAN, *Primary Examiner.*

J. T. GOOLKASIAN, *Assistant Examiner.*